(12) United States Patent
Han et al.

(10) Patent No.: US 9,411,097 B2
(45) Date of Patent: Aug. 9, 2016

(54) OPTICAL MODULE

(71) Applicant: ELECTRONICS AND TELECOMMUNICATIONS RESEARCH INSTITUTE, Daejeon (KR)

(72) Inventors: Young Tak Han, Daejeon (KR); Sang Ho Park, Daejeon (KR); Yong Soon Baek, Daejeon (KR); Jang Uk Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/727,751

(22) Filed: Jun. 1, 2015

(65) Prior Publication Data

US 2016/0154177 A1    Jun. 2, 2016

(30) Foreign Application Priority Data

Nov. 27, 2014  (KR) .................. 10-2014-0167781

(51) Int. Cl.
*G02B 6/12*    (2006.01)
*G02B 6/36*    (2006.01)
(52) U.S. Cl.
CPC ........................ *G02B 6/12* (2013.01)
(58) Field of Classification Search
None
See application file for complete search history.

(56) References Cited

U.S. PATENT DOCUMENTS

| 8,036,505 B2 * | 10/2011 | Hasegawa | ............ | G02B 6/1203 385/14 |
| 8,798,409 B2 * | 8/2014 | Pardo | .................... | H04B 10/506 385/129 |

(Continued)

FOREIGN PATENT DOCUMENTS

KR  10-2007-0042966 A   4/2007
KR      10-1430634 B1    8/2014

OTHER PUBLICATIONS

T. Fujisawa et al., "Ultracompact, 160-Gbit/s transmitter optical subassembly based on 40-Gbit/s×4 monolithically integrated light source", Optics Express, vol. 21, No. 1, pp. 182-189, Jan. 14, 2013.

(Continued)

*Primary Examiner* — Hemang Sanghavi
(74) *Attorney, Agent, or Firm* — Rabin & Berdo, P.C.

(57) ABSTRACT

Provided herein is an optical module including an optical bench having a first step with a first depth and a second step with a second depth that is smaller than the first depth; a silicon carrier disposed above the first step, and where at least one semiconductor chip is installed; an AWG chip (Arrayed Waveguide Grating chip) secured to the second step, extends up to the first step, and is chip-to-chip bonded with the silicon carrier above the first step; a lens disposed on an upper surface of the optical bench where the first step and the second step are not formed; and a metal package surrounding the optical bench, silicon carrier, AWG chip and lens, wherein at one side of the metal package, a double slit that includes an upper slit and a lower slit are formed, a DC FPCB (Direct Current FPCB) extends from outside towards inside the metal package through the upper slit and is secured to a support formed on an inner surface of the upper slit, and an RF FPCB (Radio Frequency FPCB) extends from outside towards inside the metal package through the lower slit and is secured to an upper portion of the silicon carrier, and the upper slit and the lower slit of the double slit being sealed by an elastic epoxy.

20 Claims, 3 Drawing Sheets

(56) References Cited

U.S. PATENT DOCUMENTS

2007/0110368 A1    5/2007   Yagi et al.
2010/0322569 A1*  12/2010   Ohyama ............ G02B 6/12019
                                                              385/92
2012/0128290 A1    5/2012   Han et al.
2012/0189314 A1    7/2012   Xu et al.

OTHER PUBLICATIONS

T. Yoshimatsu et al., "Compact and high-sensitivity 100-Gb/s (4×25Gb/s) APD-ROSA with a LAN-WDM PLC demultiplexer", Optics Express, vol. 20, No. 26, pp. B393-B398, Dec. 10, 2012.
Young Tak Han et al., "LAN-WDM based 100G TOSA module by silica PLC hybrid assembly", The 21th Conference on Optoelectronics and Optical Communications, Jun. 3-5, 2015, English abstract.

\* cited by examiner

OPTICAL MODULE

CROSS-REFERENCE TO RELATED APPLICATION

The present application claims priority to Korean patent application number 10-2014-0167781, filed on Nov. 27, 2014, the entire disclosure of which is incorporated herein in its entirety by reference.

BACKGROUND

1. Field of Invention

Various embodiments of the present disclosure relate to an optical module, and more particularly, to a low-price subminiature optical module for transmitting a high frequency signal.

2. Description of Related Art

Due to the development of network technologies such as broadband mobile, clouding network, IPTV and smart phone and the like, video-based high-capacity communication is increasing explosively. In line with this increase, the transmission speed of optical modules has also improved significantly. Now, there is a pressing need for a technology that could realize small-sized highly efficient optical modules at low cost.

Generally, in the case of a mini-flat type package of a single channel, DC (Direct Current) and high-speed RF (Radio Frequency) signal wirings are realized using a high price ceramic feed-through and a low price FPCB (Flexible Printed Circuit Board). However, a multi-channel optical module, that is, an optical module with four or more channels has much more pins compared to that with a single channel, and thus when a wiring is realized using one FPCB, there is a problem that the width of the FPCB becomes bigger than that of the metal package of the optical module. Thus, in conventional technologies, in order to resolve this problem, a DC/RF flexible printed circuit board is individually connected to a ceramic feed-through consisting of numerous layers to configure a subminiature optical module.

However, not only is it extremely difficult and costly to manufacture a multilayered ceramic feed-through, but the process of brazing the ceramic feed-through to the metal package such that it is hermetically sealed has a low yield rate, and thus there are limitations to reducing the cost of the optical module.

Furthermore, in conventional technologies, a high price ceramic submount is used to transmit and process a high frequency signal in an optical transceiver module of a data rate of 10 Gbps or more, and in the ceramic submount and FPCB, CPW (CoPlanar Waveguide) type electrodes are used. Herein, in order to transmit the high frequency signal without any reflection, a termination matching resistor is integrated onto the ceramic submount in a thin-film type, and in order to prevent the high frequency signal from being distorted by resonance, a ground via hole that electrically connects an upper ground and a lower ground is formed. Forming such a thin-film type matching resistor and forming the ground via hole on the ceramic submount are very expensive processes, which would account for a significant portion of the cost of subsidiary materials.

Not only that, when using the ceramic feed-through, in the optical module, the ceramic submount and the ceramic feed-through are connected by wire bonding to transmit an RF signal, and in the outside of the optical module, the FPCB is connected to the ceramic feed-through by soldering to transmit an RF signal. When using such different bonding methods, that is, wire bonding and soldering, for each part of the ceramic feed-through, there is a problem that reflection may increase due to the mismatch of characteristic impedance when transmitting an RF signal, causing signal distortion.

SUMMARY

A purpose of the present disclosure is to provide a low cost subminiature optical module for transmitting a high frequency signal.

An embodiment of the present disclosure provides an optical module including an optical bench having a first step with a first depth and a second step with a second depth that is smaller than the first depth; a silicon carrier disposed above the first step, and where at least one semiconductor chip is installed; an AWG chip (Arrayed Waveguide Grating chip) secured to the second step, extends up to the first step, and is chip-to-chip bonded with the silicon carrier above the first step; a lens disposed on an upper surface of the optical bench where the first step and the second step are not formed; and a metal package surrounding the optical bench, silicon carrier, AWG chip and lens, wherein at one side of the metal package, a double slit that includes an upper slit and a lower slit are formed, a DC FPCB (Direct Current FPCB) extends from outside towards inside the metal package through the upper slit and is secured to a support formed on an inner surface of the upper slit, and an RF FPCB (Radio Frequency FPCB) extends from outside towards inside the metal package through the lower slit and is secured to an upper portion of the silicon carrier.

Another embodiment of the present disclosure provides an optical module including an optical bench having a first step with a first depth and a second step with a second depth that is smaller than the first depth; a silicon carrier disposed above the first step, and where at least one semiconductor chip is installed; an AWG chip (Arrayed Waveguide Grating chip) secured to the second step, extends up to the first step, and is chip-to-chip bonded with the silicon carrier above the first step; a lens disposed on an upper surface of the optical bench where the first step and the second step are not formed; and a metal package surrounding the optical bench, silicon carrier, AWG chip and lens, wherein at one side of the metal package, a double slit that includes an upper slit and a lower slit are formed, a DC FPCB (Direct Current FPCB) extends from outside towards inside the metal package through the upper slit and is secured to a first support formed on an inner surface of the upper slit, and a first RF FPCB (Radio Frequency FPCB) extends from outside towards inside the metal package through the lower slit and is secured to a second support formed on an inner surface of the lower slit, and a second RF FPCB (Radio Frequency FPCB) is formed on an upper portion of the silicon carrier and is wire bonded to the first RF FPCB.

According to the present disclosure, it is possible to dramatically reduce the cost for manufacturing an optical module. Furthermore, it is possible to improve the electrical characteristics of high frequency signals of 10 Gbps or more, particularly, high frequency signals of 25 Gbps, and provide an effect of preventing a high frequency resonance mode.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
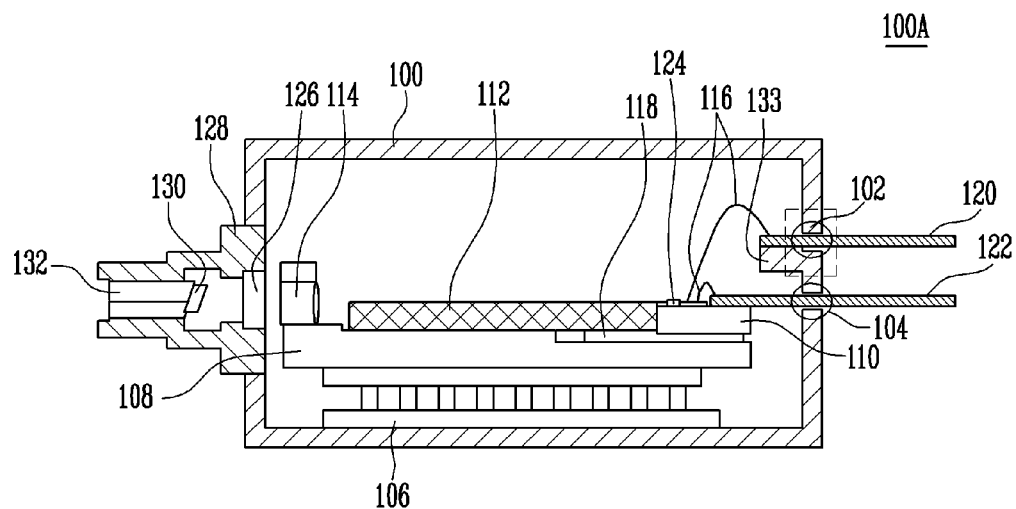
FIG. 1 is a view illustrating an optical module according to an embodiment of the present disclosure.

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

FIG. 1 is a view illustrating an optical module according to an embodiment of the present disclosure.

Referring to FIG. 1, the optical module 100A includes a double slit consisting of an upper slit 102 and a lower slit 104, a TEC (Thermo-Electric Cooler) 106, optical bench 108, silicon carrier 110, AWG chip (Arrayed Waveguide Grating chip) 112, lens 114, DC FPCB (Direct Current FPCB) 120, RF FPCB (Radio Frequency FPCB) 122, semiconductor chip for optical transceiving 124, and metal package 100.

The TEC 106 may be provided inside the metal package 100. The TEC 106 may be provided inside the metal package 100 by a bearing plate and bearing column. The bearing plate and the bearing column may be configured as one thermo-electric structure. The TEC 106 is for maintaining a constant temperature inside the optical module 100A, thereby guaranteeing a safe operation of the optical module 100A.

The optical bench 108 may be disposed above the TEC 106. The optical bench 108 may have a first step having a first depth and a second step having a second depth that is smaller than the first depth. The optical bench 108 may be made of a metal material that has excellent thermal conductivity and electrical conductivity, and low thermal expansion. The optical bench 108 may be an MOB (Metal Optical Bench) or a SiOB (Silicon Optical Bench). The MOB may include at least one of CuW (copper-tungsten), copper, kovar, and Al (aluminum) alloy, or a combination thereof. The surface of the MOB may be further provided with a gold plating layer in order to further improve the electrical conductivity. The SiOB may include a silicon substrate and a gold plating layer provided on the silicon substrate. The silicon substrate may have an excellent thermal conductivity, and the gold plating layer may improve the electrical conductivity on the surface of the gold plating layer and be used as a GND layer. Gold may be deposited on the silicon substrate, and such deposited metal may be used as an electrical GND. The optical bench 108 may serve not only the thermal conduction function but also the optical axis alignment function.

Above the first step of the optical bench 108, the silicon carrier 110 where at least one semiconductor chip is installed may be disposed. Herein, the semiconductor chip installed in the silicon carrier 110 may include at least one of a semiconductor chip for optical transceiving (DML, EML, R-PD), capacitor chip, thermistor chip, and electronics (DML driver IC, matching circuit unit, TIA IC). On an upper portion of the second step of the optical bench 108, the AWG chip 112 may be disposed that extends up to the first step and that is chip-to-chip bonded to the silicon carrier 110 above the first step.

AWG chip 112 may be secured to the first step using a thermally conductive adhesive 118. Herein, the thermally conductive adhesive may have elasticity so as to be able to release the thermal stress by itself. Specifically, the thermally conductive adhesive may be a thermally conductive epoxy or a thermal cream. Furthermore, the AWG chip 112 may be secured to the second step using a silver paste having an excellent thermal conductivity. Accordingly, the AWG chip may usually be secured to the second step, and the silicon carrier may usually be secured to the first step.

The lens 114 may be disposed on an upper portion of the optical bench 108 where the first step and the second step are not disposed. The lens 114 may be a bare chip type square lens or a tombstone type lens with a SUS (Steal Use Stainless) housing. The lens 114 serves to align light being emitted from the AWG 112 with an optical fiber ferrule 132 or to mutually align light being input into the AWG chip 112 through the optical fiber ferrule 132. The lens 114 may be attached to the upper surface of the optical bench 108 using epoxy.

Surrounding the metal package 100 near the lens 114, there may be a window 126 necessary for transmitting, receiving or transceiving light, and a pipe and receptacle 128 for connection to the optical fiber ferrule 132. The window 126 may include sapphire. An isolator 130 may be provided between the ferrule 132 and the window 126. However, in the case of a ROSA (Receiver Optical Sub-Assembly), the isolator 130 is not provided.

The metal package 100 may be provided such that it surrounds the optical bench 108, silicon carrier 110, AWG chip 112, and lens 114 explained above.

On one side of the metal package 110, the double slit consisting of the upper slit 102 and lower slit 104 may be formed such that each of FPCB 120, 122 may extend from outside towards inside of the metal package 100 through each slit. This is illustrated in detail in FIG. 3.

Figure 3:
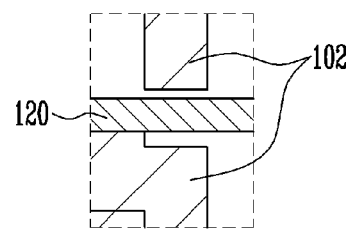
FIG. 3 is a view illustrating a slit according to the embodiment of the present disclosure.

FIG. 3 is a view illustrating a slit according to the embodiment of the present disclosure.

FIG. 3 illustrates a structure where the DC FPCB 120 extends from outside towards inside the metal package 100 as it passes the upper slit 102.

Specifically, the DC FPCB 120 may extend from outside towards inside the metal package 100 through the upper slit 102 and be secured to a support 133 formed on an inner surface of the upper slit 102, and the RF FPCB (Radio Frequency FPCB) 122 may extend from outside towards inside the metal package 100 through the lower slit 104 and be secured to an upper portion of the silicon carrier 110. Herein, the RF FPCB 122 may be attached to the upper portion of the silicon carrier 110 using a silver paste having excellent thermal conductivity. Accordingly, a ground path of the RF FPCB 122 and the optical bench 108 may be formed to be electrically connected, having a same ground.

A bonding pad may be formed on the DC FPCB 120, RF FPCB 122 and silicon carrier 110. The bonding pad formed on the DC FPCB 120 and the RF FPCB 122 may be connected to the bonding pad formed on the silicon carrier 110 by wire bonding 116.

The support 133 may be made of a metal such as CuW (copper tungsten) or a firm dielectric material. The support 133 may be attached to the inside of the metal package 100 by a silver paste or epoxy. Furthermore, in some cases, the support 133 may be attached by soldering, or may be manufactured as one integrated structure with the metal package 100.

The upper slit 102 and lower slit 104 may be sealed by an elastic epoxy. In such a case of sealing the upper slit 102 and lower slit 104 by the elastic epoxy, semi-hermetic sealing may be guaranteed.

Unlike a conventional package structure, the present disclosure does not use a ceramic feed-through and so reduces electrical signal connections, and thus it is advantageous for high frequency signal transmission and is capable of easily forming a ground via hole on a FPCB. Furthermore, in the present disclosure, the distance between a signal electrode formed on the FPCB and the lower ground is very close, that is, about 50~76 um, and polyimide or Teflon material having a low dielectric constant (permitivity) of 2.5~4 may be used as the dielectric material of the FPCB, and thus compared to a conventional ceramic submount that uses a high dielectric constant (5~9) and thick substrate (381~508 um), there is also an advantage of lowering the possibility that signal distortion will occur due to high frequency resonance and high-order mode.

Figure 2:
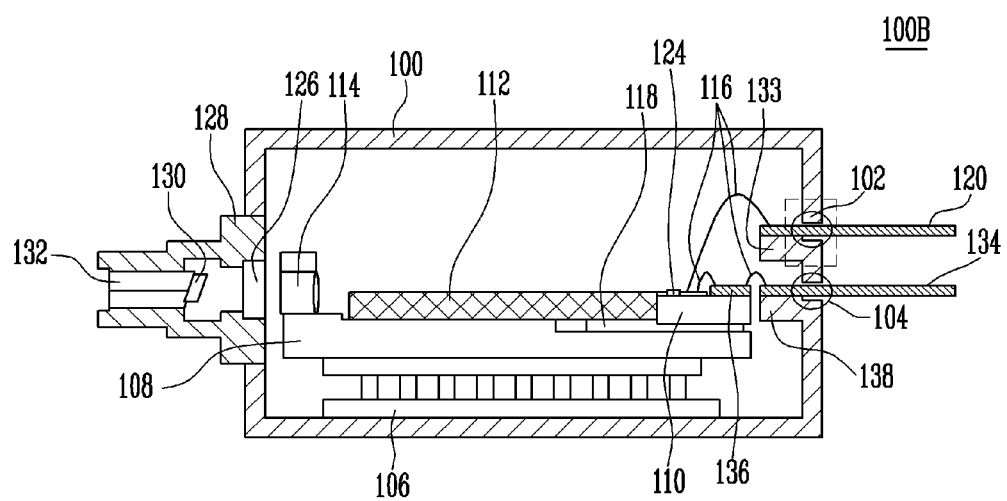
FIG. 2 is a view illustrating an optical module according to another embodiment of the present disclosure.

FIG. 2 is a view illustrating an optical module according to another embodiment of the present disclosure.

An optical module 100B according to the embodiment illustrated in FIG. 2 has the same structure as the optical module 100A according to the embodiment illustrated in FIG. 1, except from the RF wiring structure.

Referring to FIG. 2, on one side of a metal package 100, a double slit including an upper slit 102 and a lower slit 104 are formed, and through each slit, FPCB 120, 134 may extend from outside towards inside of the metal package 100. This is illustrated in detail in FIG. 3.

FIG. 3 is a view illustrating a slit according to the embodiment of the present disclosure.

FIG. 3 illustrates a structure where the DC FPCB 120 extends from outside towards inside the metal package 100 as it passes the upper slit 102.

Specifically, the DC FPCB 120 may extend from outside towards inside the metal package 100 through the upper slit 102 and be secured to a first support 133 formed on an inner surface of the upper slit 102. Furthermore, a first RF FPCB 134 may extend from outside towards inside the metal package 100 through the lower slit 104 and be secured to a second support 138 formed on an inner surface of the lower slit 104, and a second RF FPCB 136 may be formed on an upper portion of the silicon carrier 110 and be connected to the first RF FPCB 134 by wire bonding 116. Herein, the second RF FPCB 136 may be attached to the upper portion of the silicon carrier 110 using a silver paste having an excellent thermal conductivity. Accordingly, a ground path of the RF FPCB 136 and the silicon carrier 110 may be formed to be electrically connected, having a same ground.

A bonding pad may be formed on the DC FPCB 120, second RF FPCB 136 and silicon carrier 110. The bonding pad formed on the DC FPCB 120 and the second RF FPCB 136 may be connected to the bonding pad formed on the silicon carrier 110 by wire bonding 116.

The first support 133 and second support 138 may be made of a metal such as CuW (copper tungsten) or a firm dielectric material. The first support 133 and second support 138 may be attached to the inside of the metal package 100 by a silver paste or epoxy. Furthermore, in some cases, the first support 133 and second support 138 may be attached by soldering, or may be manufactured as one integrated structure with the metal package 100.

The upper slit 102 and lower slit 104 may be sealed by an elastic epoxy. In such a case of sealing the upper slit 102 and lower slit 104 by the elastic epoxy, semi-hermetic sealing can be guaranteed.

In other words, unlike in the embodiment illustrated in FIG. 1, in the embodiment illustrated in FIG. 2, the RF FPCB 122 may be divided into the first RF FPCB 134 and second RF FPCB 136, and the first and second RF FPCB 134, 136 may be connected by the wire bonding 116. Such a wiring structure has an advantage of minimizing the heat from outside being transmitted along the metal package 100 and the first RF FPCB 134 to the upper portion of the silicon carrier 110.

FIGS. 4 to 7 are views illustrating planar structures inside the optical modules of FIGS. 1 and 2. Hereinbelow, the planar structures inside the optical module 100A, 100B according to the embodiments of FIGS. 1 and 2 will be explained with reference to FIGS. 4 to 7.

Figure 4:
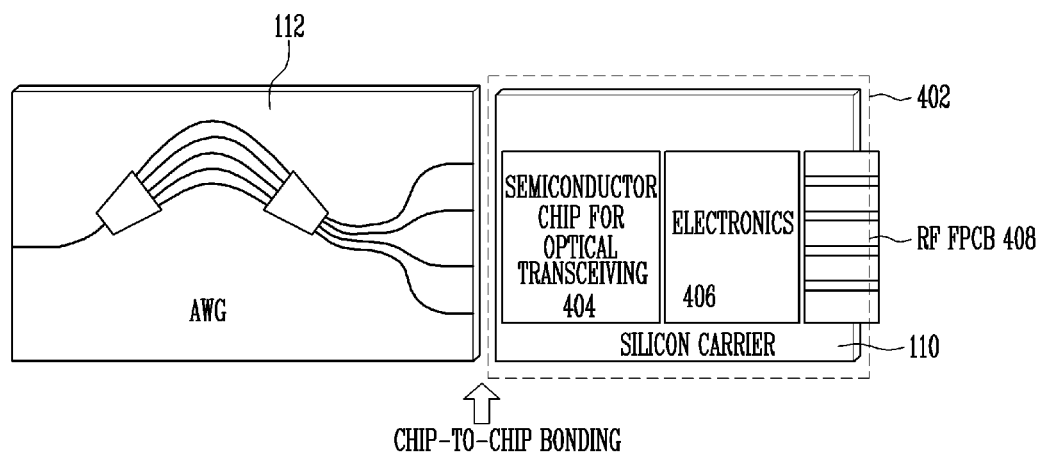
FIG. 4 is a view illustrating a planar structure inside the optical modules of FIGS. 1 and 2.

First, referring to FIG. 4, the AWG chip and silicon carrier are aligned and chip-to-chip bonded. In a case where the optical module 100 of the present disclosure operates as a TOSA (Transmitter Optical Sub-Assembly), light is output through the AWG chip using the semiconductor chip for optical transceiving 404 as the light source. In a case where the optical module 100 operates as a ROSA (Receiver Optical Sub-Assembly), the semiconductor chip for optical transceiving 404 is used as an R-PD (Receiver PhotoDiode), and light is received through the AWG chip.

The semiconductor chip for optical transceiving 404 may include a DML (Direct Modulation Laser) or EML (Electro-absorption Modulator integrated Laser) as the light source, and photodiode for optical receiving as the R-PD (Receiver PhotoDiode). Furthermore, the electronics 406 may be a DML driver IC, matching circuit unit, or TIA (TransImpedance Amplifier) IC.

The semiconductor chip for optical transceiving 404 and the electronics 406 may be formed on an upper portion of the silicon carrier 110 together with the RF FPCB 408.

Figure 5:
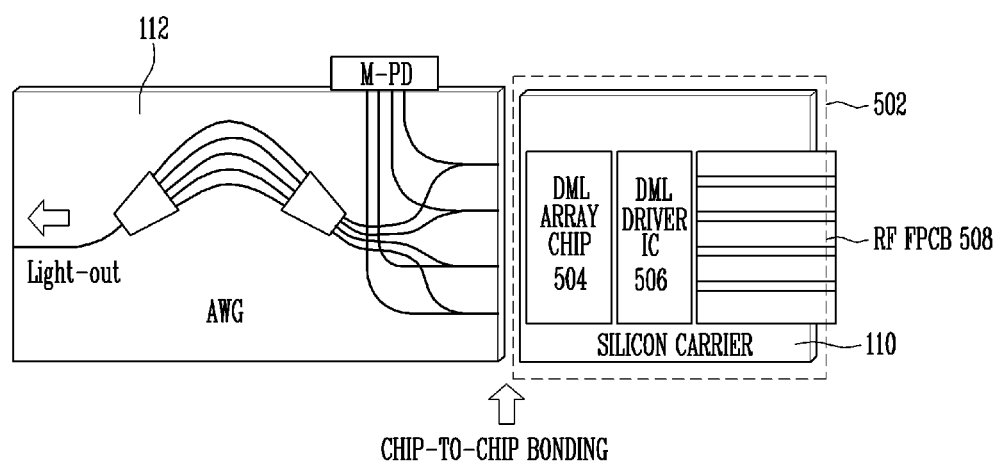
FIG. 5 is a view illustrating an exemplary embodiment of FIG. 4.

FIG. 5 illustrates a case where the optical module of the present disclosure operates as a TOSA.

Referring to FIG. 5, the semiconductor chip for optical transceiving may be a DML array chip (Direct Modulation Laser array chip) 504, and the electronics may be a DML driver IC 506. In more detail, the TOSA illustrated in FIG. 5 is a four-channel TOSA, and the four-channel DML array chip 504 may be applied on an upper portion of the silicon carrier 110. On the upper portion of the silicon carrier 110, the four-channel array chip 504 may be die-bonded with precision, and the four-channel DML driver IC 506 may be disposed on a rear side of the four-channel DML array chip 504, and an RF FPCB 508 may be attached on an upper portion of the silicon carrier 110.

At an input end of the AWG chip 112, a Y-branch waveguide may be formed, and at a point where the Y-branch waveguide ends, an M-PD (Monitoring PhotoDiode) may be formed. This configuration is to monitor the light being output from the DML array chip 504, and the Y-branch waveguide may be arranged such that each of the four individual waveguides at the input end of the AWG chip 112 has about 8~10% branch ratio, and then at one end of the AWG chip 112, the M-PD may be formed. The AWG chip 112 may be attached to the silicon carrier 110 integrated with the DML array chip 504 and the DML driver IC 506 by active alignment and mutual chip-to-chip bonding.

Figure 6:
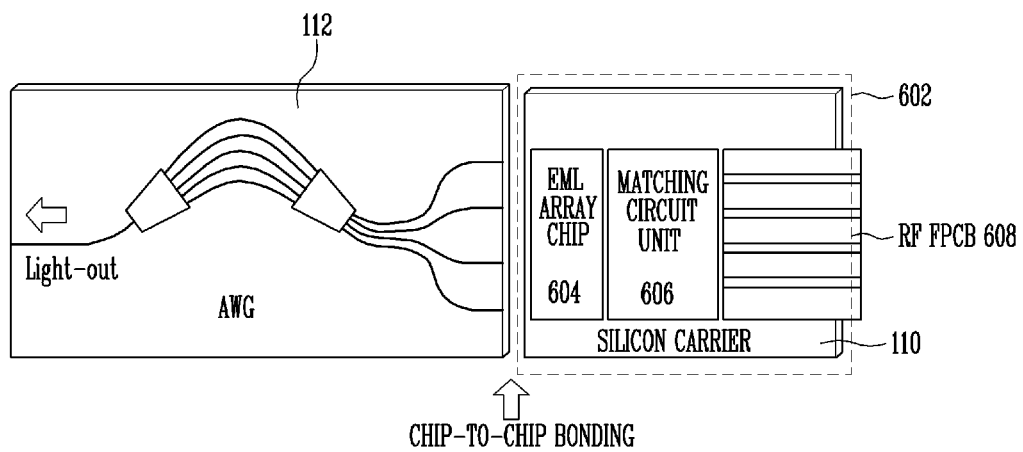
FIG. 6 is a view illustrating an exemplary embodiment of FIG. 4.

FIG. 6 illustrates another case where the optical module 100 of the present disclosure operates as a TOSA.

Referring to FIG. 6, the semiconductor chip for optical transceiving may be an EML array chip (Electro-absorption Modulator integrated Laser array chip) 604, and the electronics may be a matching circuit unit 606. The matching circuit unit 606 may include resistors. In more detail, the TOSA illustrated in FIG. 6 may be a four-channel TOSA, and on an upper portion of the silicon carrier 110, the four-channel EML array chip 604 may be applied. On the upper portion of the silicon carrier 110, the four-channel EML array chip 604 may be die-bonded with precision, and the matching circuit unit that uses 50-ohm resistors may be disposed on a rear side of the four-channel EML array chip 604, and an RF FPCB 608 may be attached on an upper portion of the silicon carrier 110.

Unlike in FIG. 5, in this case, an M-PD is integrated with the EML array chip 604, and thus there is no need to form a Y-branch waveguide on the AWG chip. The AWG chip 112 may be attached to the silicon carrier 110 integrated with the EML array chip 604 and the matching circuit unit 606 by active alignment and mutual chip-to-chip bonding.

Figure 7:
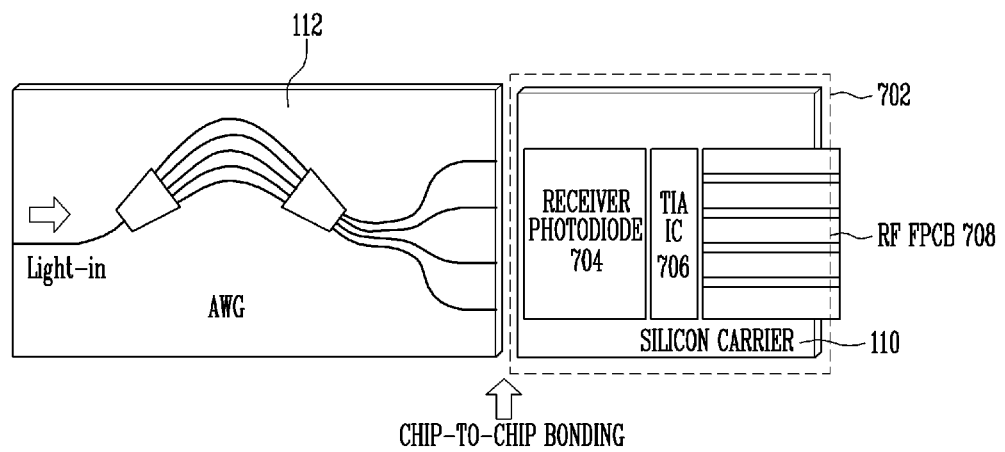
FIG. 7 is a view illustrating an exemplary embodiment of FIG. 4.

FIG. 7 illustrates a case where the optical module 100 of the present disclosure operates as a ROSA.

Referring to FIG. 7, the semiconductor chip for optical transceiving may be an R-PD (Receiver PhotoDiode) 704, and the electronics may be a TIA (TransImpedance Amplifier) IC 706. In more detail, the ROSA illustrated in FIG. 7 may be a four-channel ROSA, and four discrete R-PD chips or an R-PD array chip 704 may be applied on the upper portion of the silicon carrier 110 with precision, and the four-channel TIA IC 706 may be disposed on a rear side of the R-PD chip 704, and an RF FPCB 708 may be attached on an upper portion of the silicon carrier 110.

Unlike in FIGS. 4 to 6, since the optical module 100 is a ROSA, there is no need for an M-PD for monitoring light. Furthermore, since the ROSA is not a heating element, there is no need for a TEC (Thermo-Electric Cooler) either. The AWG chip 112 may be attached to the silicon carrier 110 integrated with the R-PD chip 704 and the TIA IC 706 by active alignment and mutual chip-to-chip bonding.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An optical module comprising:
    an optical bench having a first step with a first depth and a second step with a second depth that is smaller than the first depth;
    a silicon carrier disposed above the first step, and where at least one semiconductor chip is installed;
    an AWG chip (Arrayed Waveguide Grating chip) secured to the second step, extending up to the first step, and being chip-to-chip bonded with the silicon carrier above the first step;
    a lens disposed on an upper surface of the optical bench where the first step and the second step are not positioned; and
    a metal package surrounding the optical bench, the silicon carrier, the AWG chip and the lens,
    wherein at one side of the metal package, a double slit including an upper slit and a lower slit are provided,
    a DC FPCB (Direct Current FPCB) extends from outside towards inside the metal package through the upper slit and is secured to a support provided on an inner surface of the upper slit, and
    an RF FPCB (Radio Frequency FPCB) extends from outside towards inside the metal package through the lower slit and is secured to an upper portion of the silicon carrier.

2. The optical module according to claim 1, wherein the upper slit and the lower slit of the double slit are sealed by an elastic epoxy.

3. The optical module according to claim 1, wherein the silicon carrier and the AWG chip are secured to the first step and the second step, respectively, via a thermally conductive adhesive.

4. The optical module according to claim 1, wherein a bonding pad on the DC FPCB is connected to a bonding pad on the silicon carrier by wire bonding, and
    a bonding pad on the RF FPCB is connected to the bonding pad on the silicon carrier by wire bonding.

5. The optical module according to claim 1, further comprising a thermo-electric cooler inside the metal package,
    wherein the optical bench is disposed above the thermo-electric cooler.

6. The optical module according to claim 1, wherein the semiconductor chip installed in the silicon carrier includes at least one of a semiconductor chip for optical transceiving, a capacitor chip, a thermistor chip, and an electronics.

7. The optical module according to claim 6,
wherein the semiconductor chip for optical transceiving includes a DML array chip (Direct Modulation Laser array chip),
the electronics includes a DML driver IC, and
a Y-branch waveguide is provided at an input end of the AWG chip, and an M-PD (Monitoring Photodiode) is provided at a point where the Y-branch waveguide ends.

8. The optical module according to claim 7, wherein the Y-branch waveguide has a branch/tap ratio between 8% and 10%.

9. The optical module according to claim 6,
wherein the semiconductor chip for optical transceiving includes an EML array chip (Electro-absorption Modulator integrated Laser array chip),
the electronics includes a matching circuit unit, and
the M-PD is integrated with the EML array chip.

10. The optical module according to claim 6,
wherein the semiconductor chip for optical transceiving includes an R-PD (Receiver PhotoDiode), and
the electronics includes a TIA (TransImpedance Amplifier) IC.

11. An optical module comprising:
an optical bench having a first step with a first depth and a second step with a second depth that is smaller than the first depth;
a silicon carrier disposed above the first step, and where at least one semiconductor chip is installed;
an AWG chip (Arrayed Waveguide Grating chip) secured to the second step, extending up to the first step, and being chip-to-chip bonded with the silicon carrier above the first step;
a lens disposed on an upper surface of the optical bench where the first step and the second step are not positioned; and
a metal package surrounding the optical bench, the silicon carrier, the AWG chip and the lens,
wherein at one side of the metal package, a double slit including an upper slit and a lower slit are provided,
a DC FPCB (Direct Current FPCB) extends from outside towards inside the metal package through the upper slit and is secured to a first support provided on an inner surface of the upper slit, and
a first RF FPCB (Radio Frequency FPCB) extends from outside towards inside the metal package through the lower slit and is secured to a second support provided on an inner surface of the lower slit, and
a second RF FPCB (Radio Frequency FPCB) is on an upper portion of the silicon carrier and is wire bonded to the first RF FPCB.

12. The optical module according to claim 11, wherein the upper slit and the lower slit of the double slit are sealed by an elastic epoxy.

13. The optical module according to claim 11, wherein the silicon carrier and the AWG chip are secured to the first step and the second step, respectively, via a thermally conductive adhesive.

14. The optical module according to claim 11,
wherein a bonding pad on the DC FPCB is connected to a bonding pad on the silicon carrier by wire bonding, and
a bonding pad on the second RF FPCB is connected to the bonding pad on the silicon carrier by wire bonding.

15. The optical module according to claim 11, further comprising a thermo-electric cooler inside the metal package,
wherein the optical bench is disposed above the thermo-electric cooler.

16. The optical module according to claim 11, wherein the semiconductor chip installed in the silicon carrier includes at least one of a semiconductor chip for optical transceiving, a capacitor chip, a thermistor chip, and an electronics.

17. The optical module according to claim 16,
wherein the semiconductor chip for optical transceiving includes a DML array chip (Direct Modulation Laser array chip),
the electronics includes a DML driver IC, and
a Y-branch waveguide is provided at an input end of the AWG chip, and an M-PD (Monitoring Photodiode) is provided at a point where the Y-branch waveguide ends.

18. The optical module according to claim 17, wherein the Y-branch waveguide has a branch/tap ratio between 8% and 10%.

19. The optical module according to claim 16,
wherein the semiconductor chip for optical transceiving includes an EML array chip (Electro-absorption Modulator integrated Laser array chip),
the electronics includes a matching circuit unit, and
the M-PD is integrated with the EML array chip.

20. The optical module according to claim 16,
wherein the semiconductor chip for optical transceiving includes an R-PD (Receiver PhotoDiode), and
the electronics includes a TIA (TransImpedance Amplifier) IC.

* * * * *